Patented July 5, 1938

2,122,793

UNITED STATES PATENT OFFICE 2,122,793

TREATMENT OF CELLULOSE ACETATE AND OTHER ORGANIC ESTERS OF CELLULOSE

Henry Dreyfus, London, and Robert Wighton Moncrieff, Spondon, England, assignors to Celanese Corporation of America, a corporation of Delaware No Drawing. Application May 16, 1936, Serial No. 80,166. In Great Britain May 23, 1935

9 Claims. (Cl. 8—20)

This invention relates to the treatment of cellulose acetate and other organic esters of cellulose, particularly in the form of filaments, fibres, yarns, films, fabrics and like materials.

According to the present invention the acidyl content of such esters is reduced by treatment with a hydrolyzable halide of an amphoteric metal, for example titanium tetrachloride.

The process of the invention presents many advantages over other methods for reducing the acidyl content of the esters. Thus, for example, by treating cellulose acetate threads or like materials with titanium tetrachloride the materials may be given an affinity for cotton dyes without substantial loss in weight. The loss in weight may, in fact, be less than .5% of the original weight of the materials. Even allowing for the fact that the loss in weight due solely to the loss in acidyl content is to some extent compensated for by the increase due to fixation of titanium, this is a very remarkable result since to impart an affinity for cotton dyes to cellulose acetate by any of the ordinary processes of saponification involves a loss in weight of at least 10%. It would appear therefore that the hydrolysis of the materials effected by the process of the present invention is extremely deep-seated.

The titanium is held very tenaciously by the materials and cannot readily be removed by scouring or like operations. The melting point of the materials is raised to a remarkable extent. It may for example be raised to 250° C., 260° C. or even above 270° C. Moreover, when the materials are heated, charring occurs at a lower temperature than the melting point so giving warning in ironing and calendering operations if the temperature is too high, before serious damage is done to the materials. The process may very considerably alter the solubility properties of the material, for example a cellulose acetate substantially completely soluble in commercial acetone may, by the process of the invention, have its solubility so changed that only 10% or even less dissolves in acetone; or the solubility in acetone may be reduced to an intermediate value, for example 30%, 40%, or 50%. A further result of the process is that the treated materials are less reactive towards various reagents, for example swelling agents, than are the initial materials. Thus a cellulose acetate which is normally readily delustrable by immersion for a short time in hot aqueous liquids, may by the process of the invention be rendered almost undelustrable by such agents, and a cellulose acetate which normally undergoes rapid shrinkage when acted upon by methylene chloride, ethylene chloride and like swelling agents, is after treatment, according to the invention, very much less susceptible to the shrinking action of such agents.

The titanium tetrachloride or other halide is preferably applied in solution in a liquid having a hydrolyzing action on the halide. This liquid may with advantage be water but useful results can be obtained by applying the halide in solution in organic liquids containing hydroxyl groups, for example, methyl, ethyl or isopropyl alcohol. Aqueous solutions containing organic hydroxy bodies of low molecular weight, particularly bodies having a swelling action on the cellulose ester, for example the alcohols referred to above, may also be used as solvents for the halide. It is of advantage to apply the halide in conjunction with an acid other than the acid formed by hydrolysis. Acids such as formic, acetic and propionic acid, which are swelling agents for the cellulose ester, are particularly suitable. The acid may with advantage be present in the aqueous or aqueous alcoholic solution in which the halide is applied.

The concentration, temperature and time of treatment will naturally depend on the nature of the particular halide employed. Aqueous solutions containing 10–40%, e. g. 20–30 or 35% of titanium chloride and 5–20%, e. g. 10–15% of acetic acid, are very suitable. Care must be taken not to employ the halide at so high a temperature that damage to the materials results. Thus, in the case of titanium tetrachloride in concentrations between 10 and 40%, it is preferable to maintain the temperature below 50° C. and the best results have been obtained at temperatures below 40° C., for example 10° to 20°, 30° or 35° C. The time of treatment, i. e. the time during which the material is in contact with the halide and/or the acid produced by hydrolysis thereof, requires to be longer the lower the temperature employed. Even at temperatures as high as 40° C. a time of treatment of at least half-an-hour will generally be necessary and considerably longer times of treatment are advantageous under these conditions, for example between 1 and 4 or 6 hours. At temperatures in the neighbourhood of 20° C., the time of treatment may with advantage be over 10 hours, for example between 12 and 24 hours.

A convenient method of carrying out the process is to impregnate the material with the solution containing the halide, for example by immersion of the material in a bath of said solution, and to effect or complete the desired reduction in acidyl value by a batching step during which the impregnated material is allowed to dry slowly. The batching operation comprises collecting the material and allowing it to stand until the desired acidyl value is attained. The materials may be treated after impregnation to remove a proportion of the liquid retained by them. They may, for example, be centrifuged or if in convenient form, for instance in the form of fabric, passed between nip rolls for this purpose. The amount of liquid allowed to remain in the materials after the impregnation may, for example, be 60%, 80%, 100% or 120% of their weight. The impregnation will in general take a very short time, for example from a few seconds up to 2 or 3 minutes. The temperature of the bath during impregnation may be substantially the same as that employed in the batching step. This step may be effected at a temperature in the neighbourhood of 40° C., but as indicated above, it is preferable to employ somewhat lower temperatures, for example 10° to 20° C. Drying during the batching step may be expedited by carrying out this step under reduced pressure or in the presence of a current of air. It is not, however, essential that the materials should be dry at the end of the batching operation. A test of dye affinity carried out on a sample of the material will readily show whether the batching has been carried out for a sufficient time. After the batching process the material is washed and dried.

Yarns and like materials may be treated in hank form or in the form of packages wound on to foraminous supports. Alternatively the yarn may be drawn through the impregnating bath, collected by suitable means, allowed to stand until the desired acidyl value is reached, drawn through a washing bath and then over heated drying rolls to suitable collecting means. The collection of the impregnated material may be effected in centrifugal pots or the travelling yarn may be traversed by a guide in one direction and deposited in the form of coils in a container traversed in a direction at right angles to that in which the guide traverses. Material in film or fabric form may be passed through the impregnating bath and then after expressing excess liquid by means of nip rollers if desired, may be batched, and after batching, drawn through a washing bath and over heated drying rolls.

The best results have been obtained using titanium tetrachloride as the halide. Other halides, and particularly chlorides of amphoteric metals may, however, be used, for example stannic chloride and tungstic chloride. The halides should not be so readily hydrolyzable as to be incapable of existing in aqueous solution. According to a modification of the process of the invention there is employed instead of a halide of an amphoteric metal, silicon tetrachloride.

The following examples illustrate the invention:—

Example 1

Cellulose acetate yarn in hank form is impregnated with an aqueous solution containing 10 to 40% titanium tetrachloride and 5 to 20% of acetic acid by immersion in said solution for a period of 1 to 2 minutes. The material is then centrifuged until it contains from 60 to 100% of its weight of the solution and is batched at a temperature between 10 and 20° C. for 12 to 24 hours. The material is then washed in water to remove titanium tetrachloride and hydrochloric acid, and is dried.

The material may instead of being in hank form be in the form of packages wound on to foraminous bobbins in which case to expedite impregnation the solution may be pumped through the bobbin.

Example 2

A fabric composed of cellulose acetate yarn is impregnated with a solution of the same composition as used in Example 1 by drawing the fabric through the solution and then through padding rolls which are set to leave in the fabric an amount of the solution equal to 60 to 100% of the weight of the fabric. The fabric is then batched at a temperature of 10 to 20° C. until substantially dry. The substantially dry fabric is passed through a washing bath to remove titanium tetrachloride and hydrochloric acid, and then over heated drying rolls.

In a similar way other halides of amphoteric metals, e. g. stannic chloride and tungstic chloride may be used.

As indicated above valuable results can be obtained by carrying out the process so that only a very small loss of weight results, e. g. in the case of cellulose acetate 0.3–0.5 or 1%. The invention is not limited however to producing such small losses in weight. Thus in the case of cellulose acetate the loss in weight may be between 1 and 5% or more and in the case of organic esters of cellulose generally the acidyl content may be reduced by 10% or even less up to 15 or 20% or more. Preferably the acidyl content is reduced to such an extent as to impart an affinity for cotton dyes to the materials without destroying their affinity for cellulose ester dyes.

The process of the invention is of particular utility in the treatment of threads and like materials of high tenacity such as are obtainable by stretching threads of lower tenacity under the action, for example, of organic swelling agents. The stretched threads may prior to treatment according to the invention have undergone a shrinking treatment, for example by the process of Patent No. 2,058,422.

Although the process of the invention has been described with particular reference to the treatment of cellulose acetate, it is also applicable to the treatment of other organic esters of cellulose, i. e. other esters containing organic acidyl groups, for example cellulose formate, propionate, butyrate, cellulose acetate propionate, cellulose nitrate acetate, oxyethyl cellulose acetate and ethyl cellulose acetate.

Having described our invention what we desire to secure by Letters Patent is:—

1. Process for modifying the properties of threads, filaments, fibres, yarns, fabrics, films or like materials having a basis of cellulose acetate comprising reducing the acetyl content of the materials by treatment with an aqueous solution containing 10 to 40% of titanium tetrachloride at a temperature between 10 and 50° C.

2. Process for modifying the properties of filaments, fibres, yarns, fabrics, films or like materials having a basis of cellulose acetate, comprising reducing the acetyl content of the materials by impregnating them with an aqueous solution containing 10 to 40% of titanium tetrachloride and 5 to 20% of acetic acid, batching the impregnated materials for several hours at least, washing, and drying the materials, the impregnation and batching being effected at a temperature between 10 and 40° C.

3. Process for modifying the properties of filaments, fibres, yarns, fabrics, films or like materials having a basis of cellulose acetate, comprising reducing the acetyl content of the materials by impregnating them with an aqueous solution containing 20 to 40% of titanium tetrachloride and 5 to 20% of acetic acid, batching the impregnating materials for 12-24 hours, washing, and drying the materials, the impregnation and batching being effected at a temperature between 10 and 20° C.

4. Process for modifying the properties of organic esters of cellulose, comprising reducing the acidyl content of the ester by treatment with a hydrolyzable halide of titanium which on hydrolysis forms a solution that effects reduction of the acidyl content.

5. Process for modifying the properties of cellulose acetate, comprising reducing the acetyl content of the acetate in the form of filaments, fibres, yarns, fabrics, films or like materials, by treatment with titanium tetrachloride in solution in a liquid having a hydrolyzing action on the chloride.

6. Process for modifying the properties of cellulose acetate, comprising reducing the acetyl content of the acetate in the form of filaments, fibres, yarns, fabrics, films or like materials, by treatment with an aqueous solution of titanium tetrachloride.

7. Process for modifying the properties of cellulose acetate, comprising reducing the acetyl content of the acetate in the form of filament, fibres, yarns, fabrics, films or like materials, by treatment with titanium tetrachloride in solution in a liquid having a hydrolyzing action on the chloride and in the presence of a lower fatty acid having a swelling action on the cellulose acetate.

8. Process for modifying the properties of cellulose acetate, comprising reducing the acetyl content of the acetate in the form of filaments, fibres, yarns, fabrics, films or like materials, by treatment with an aqueous solution of titanium tetrachloride in the presence of a lower fatty acid having a swelling action on the cellulose acetate.

9. Process for modifying the properties of cellulose acetate, comprising reducing the acetyl content of the acetate in the form of filaments, fibres, yarns, fabrics, films or like materials, by treatment with an aqueous solution of titanium tetrachloride in the presence of an alcohol having a swelling action on the cellulose acetate.

HENRY DREYFUS.
ROBERT WIGHTON MONCRIEFF.